United States Patent
Ducharme

(10) Patent No.: US 6,375,236 B1
(45) Date of Patent: Apr. 23, 2002

(54) PROTECTIVE HANDLE FOR LOLLIPOPS

(76) Inventor: Jimmy Ducharme, 123 Pineville Rd., Dayville, CT (US) 06241

( * ) Notice: Subject to any disclaimer, the term of this patent is extended or adjusted under 35 U.S.C. 154(b) by 0 days.

(21) Appl. No.: 09/638,021

(22) Filed: Aug. 14, 2000

Related U.S. Application Data

(63) Continuation-in-part of application No. 09/176,196, filed on Oct. 21, 1998, now abandoned.

(51) Int. Cl.⁷ .............................................. A47G 19/30
(52) U.S. Cl. ........................... 294/1.1; 426/91; 426/134
(58) Field of Search .......................... 426/134, 91, 421, 426/90, 132, 110, 115; 294/1.1; 220/571; 248/519, 145.6

(56) References Cited

U.S. PATENT DOCUMENTS

| | | | | |
|---|---|---|---|---|
| 2,031,208 A | * | 2/1936 | Burgard | 426/134 |
| 2,834,685 A | * | 5/1958 | Ferguson | 426/134 |
| 2,980,039 A | * | 4/1961 | Jolly | 426/134 |
| 4,992,283 A | * | 2/1991 | Shorey | 426/90 |
| 5,224,646 A | * | 7/1993 | Biancosino | 426/132 |
| 5,324,527 A | * | 6/1994 | Coleman | 426/134 |
| 5,503,857 A | * | 4/1996 | Coleman | 426/134 |
| 5,515,998 A | * | 5/1996 | Wang | 426/134 |
| 5,690,535 A | * | 11/1997 | Coleman | 426/134 |
| 5,702,742 A | * | 12/1997 | Jones | 426/134 |
| 5,820,437 A | * | 10/1998 | Coleman | 426/134 |
| 5,874,119 A | * | 2/1999 | Coleman | 426/134 |

FOREIGN PATENT DOCUMENTS

DE 3617093 * 10/1986 ................. 426/134

* cited by examiner

*Primary Examiner*—Steven Weinstein
(74) *Attorney, Agent, or Firm*—John P. Halvonik

(57) ABSTRACT

The invention is a safety device for use in connection with candies such as lollipops that are equipped with sticks. Such handle will have a narrow opening running down the length of the handle in order to hold the narrow paper stick of the lollipop. Such handle will be equipped with a rim at the top and at the bottom to support the lollipop in an upright position and to prevent the lollipop from injuring the youngster.

3 Claims, 3 Drawing Sheets

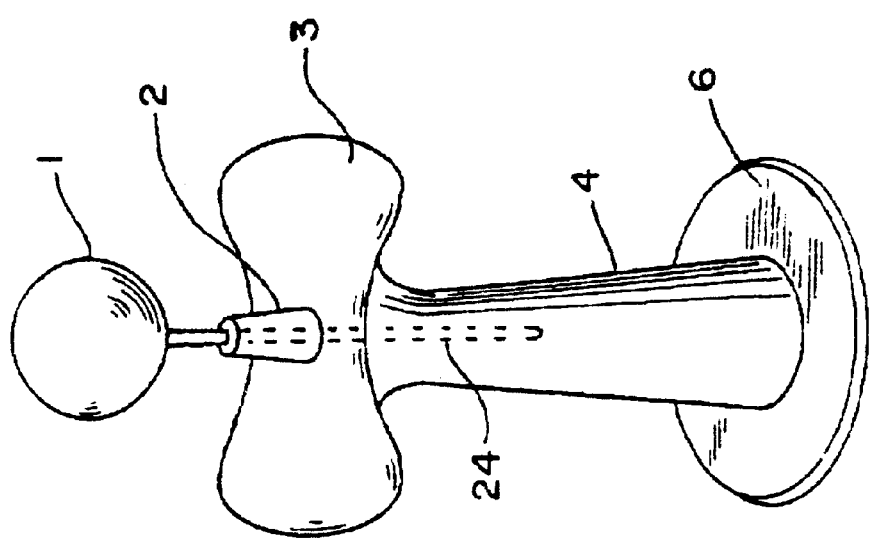
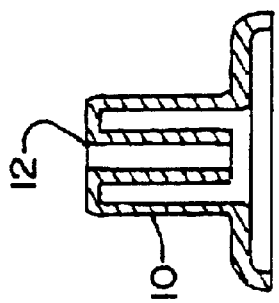
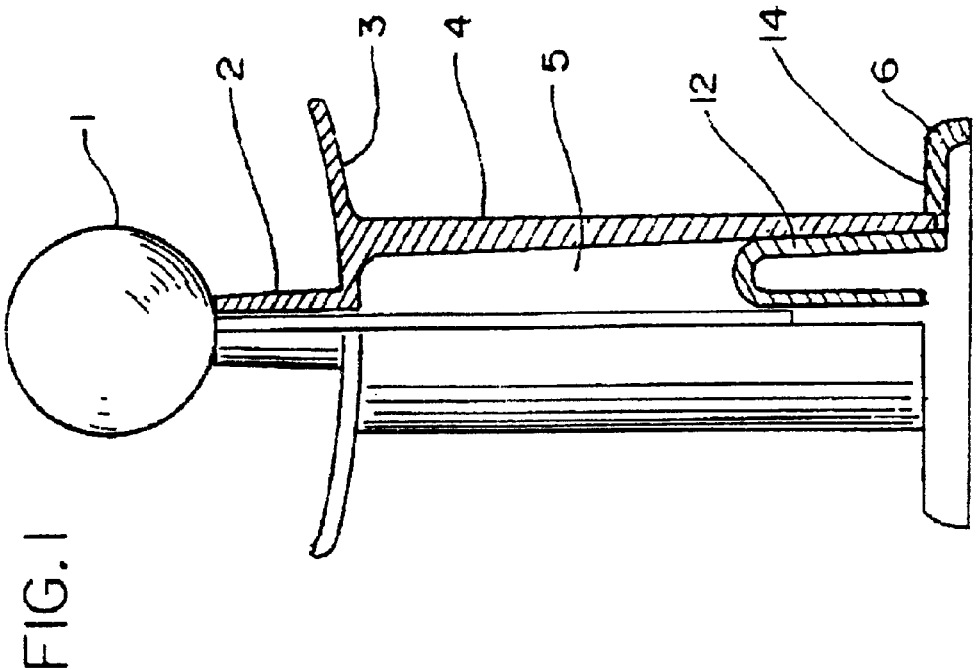

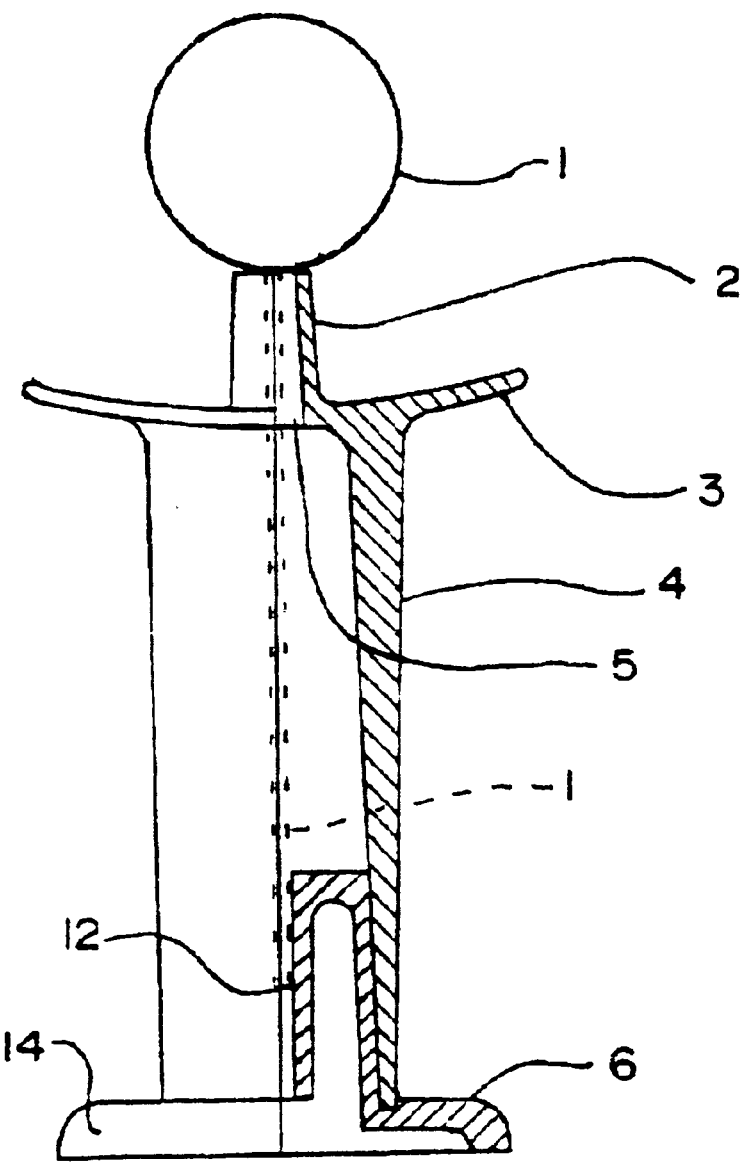
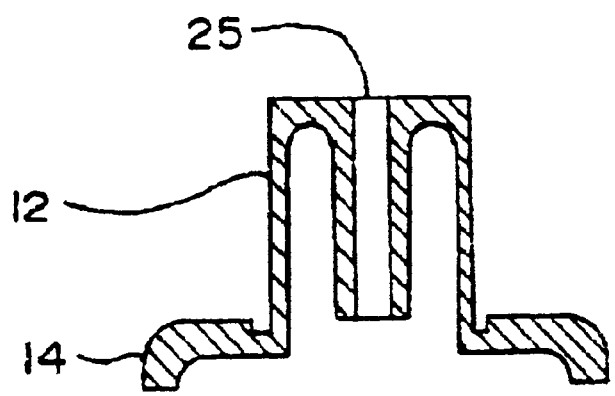

PROTECTIVE HANDLE FOR LOLLIPOPS

This application is a continuation in part of U.S. Ser. No. 09/176,196, filed Oct. 21, 1998, now abandoned.

FIELD OF THE INVENTION

The invention relates to the field of food apparatus and, in particular, to a handle designed for holding lolli pops or similar foods that have a long and thin handle that presents a danger to children among others. The handle is designed to hold the thinner, paper handle that is attached to the lollipop candy and thus make it difficult for a youngster to hurt himself by placing the stick too far into his mouth

BACKGROUND OF THE INVENTION

Lollipops typically have a candy at one end and a handle made of sturdy paper that protrudes out of the candy. The handle is used to hold the lollipop in the mouth so that the youngster can suck on the candy. The invention described herein offers a larger handle having an opening in which to hold the lollipop's paper handle and thus presents a larger thicker handle that cannot choke or become wedged in the back of the mouth as it is too large to be swallowed. The invention can be used with other candies that come with narrow sticks as well.

Lollipops, like many things, are attractive and yet dangerous to children. For one thing, youngsters put the lollipop in their mouths and this presents the risk that the youngster may play with the stick or use it in a manner unintended. For another, the youngster may inadvertently push the stick into the back of his mouth, either while running or playing or doing something else. Also, the youngster may choke or gag on the stick, again through inadvertence or simply out of curiosity. Children are of course, curious by nature and such curiosity makes them vulnerable to things that are both attractive and dangerous. They are also inattentive which makes them liable to not pay attention to the lollipop while it in their mouth and they are doing other things.

Lollipops are also very messy because the paper handle that comes with lollipops is oftentimes covered with the sticky sugar from the lollipop as the child sucks on it. Lollipops are also liable to come in contact with tables and chairs because there is no way to stand the lollipop up due to the fact that the narrow paper stick does not allow the lollipop to be stood up.

It is believed that using a handle to hold the smaller paper handle of the lollipop will minimize the danger to children of choking or gagging on the thin stick while allowing them to place the candy end of the lolli pop in their mouth. By providing a handle to hold the lollipop stick that is significantly larger than the paper stick this will provide a safety device that will prevent the lollipop from choking the child or becoming lodged in his/her mouth.

It is also believed that using the apparatus described herein will allow the lollipop to be disposed of with little mess once the child has had enough. While the apparatus is intended to be reusable the lollipop stick can be removed by either manually removing it from the apparatus or pushing it out from the bottom of the apparatus through a hollow central passage. This can be accomplished using a new lollipop or by other ways.

A larger handle for the lollipop will allow someone else to pick up the used lollipop with out having to touch the narrow paper handle directly. The paper handle is oftentimes covered with the sticky sugar from the lollipop. Sugar from the lollipop may melt off the candy but will drip down between the paper stick and the handle and thus the person disposing of the lollipop can handle the lollipop without having to touch the sticky stick.

Such handle will also allow the child to temporarily stand the lollipop up and so prevent the lollipop from coming in contact with surfaces such as tables and chairs when the child does not wish to hold onto the lollipop.

SUMMARY OF THE INVENTION

The invention is a handle designed for holding the paper stick of a lollipop or similar candy that is of larger thickness than the paper stick. The handle will have a narrow opening running down the length of the handle that is of size and shape in order to hold the narrow paper stick of the lollipop. Such handle will be equipped with a rim at the top and bottom to maintain contact with the hand of the youngster or whomever is holding the lollipop.

The rim at the top should be of size sufficient to prevent the child from forcing this end into his mouth thereby preventing mouth and throat injuries. The bottom rim will also be of size to prevent the child from placing it into his mouth. The bottom rim will also provide a convenient stand upon which to rest the lollipop and handle when not in use. A narrow extension piece having a passage continuous with the opening will run above the upper rim for a short distance, this extension will maintain the candy at a safe distance away from the handle.

It is among the objectives to provide safety handle for a lollipop that will prevent the lollipop from choking or harming a child or person sucking on the lollipop.

Another objective is to provide a handle for holding lollipops that will allow one to dispose of the lollipop without having to directly come in contact with the messy, sticky lollipop handle.

Another objective is to provide handle that can function as a stand for a lollipop and so prevent the lollipop from coming into contact with tables and other surfaces.

Other objectives will be apparent once the invention is shown and described.

DESCRIPTION OF THE DRAWINGS

FIG. 1 cross section of handle and candy;

FIG. 2 perspective view of FIG. 1;

FIG. 3 cross section of base;

FIG. 6 cut away of handle/candy;

FIG. 7 detail of base.

DESCRIPTION OF THE PREFERRED EMBODIMENT

Figure 4:
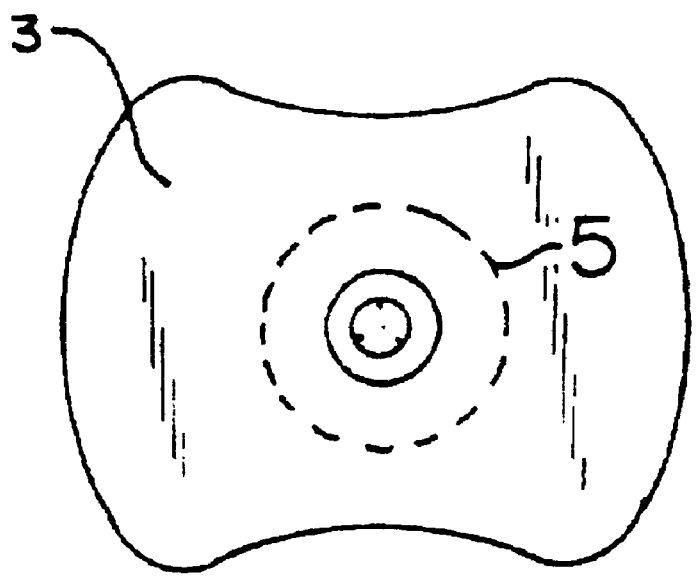
FIG. 4 top view of rim.

The overall construction of the apparatus and its use in connection with the lollipop is shown in FIGS. 1 and 2. There is a handle 4 having an extension piece or rim 3 and an extension 2 extending some distance above the rim. The handle has a central passage 5 that runs the length of the handle, There is a base 6 which may be a separate piece that interlocks with the bottom of the handle. See FIG. 7. 12 is the upper portion of the base that locks into the passage 5 and 14 is the lower portion of the base that allows it to stand upright on a table or the like.

The extension piece 2 provides a safe margin between the pop which will be in the child's mouth and the rim 3. The extension piece safeguards the uppermost part of the paper stick. The lollipop is flush against the extension piece thus preventing the child from biting the stick off. This also prevents the possibility of the pop becoming lodged in the child's throat and causing injury to the child.

The upper rim 3 is shaped to conform to the mouth and may be said to resemble the mouth guard of a pacifier. The shape of this piece is contoured to conform to the shape of the child's outer lip and mouth area. It is an exterior mouth guard which prevents the lollipop from forced or accidental entry into the child's throat. It would be shaped and sized to go over the child's lips and of course the mouth. For example should the child fall, run or lay down while eating a pop, the upper rim serves as a safeguard.

The central passage 5 is co extensive with that passage 25 that runs through the center of 12 the upper part of the base, see FIGS. 3 and 7.

4 is the exterior cylinder shaped handle which is held in the child's hand. It is long enough to be held by the full hand and all fingers. The paper stick of the lollipop is secured within the central passage 5 which extends throughout the entire device.

The candy portion of the lollipop is shown as 1 and the paper handle 24 in connection with the candy is held in central passage 5. The paper handle is seen in FIG. 2. The paper handle is held by the central passage by inserting the paper handle into the central passage 5 that extends down through the center of the safety handle 4. There may be a series of indentations on the walls of the passage 5 that may run the length of the central passage and frictionally engage the paper handle in order to secure it within the central passage.

Figure 5:
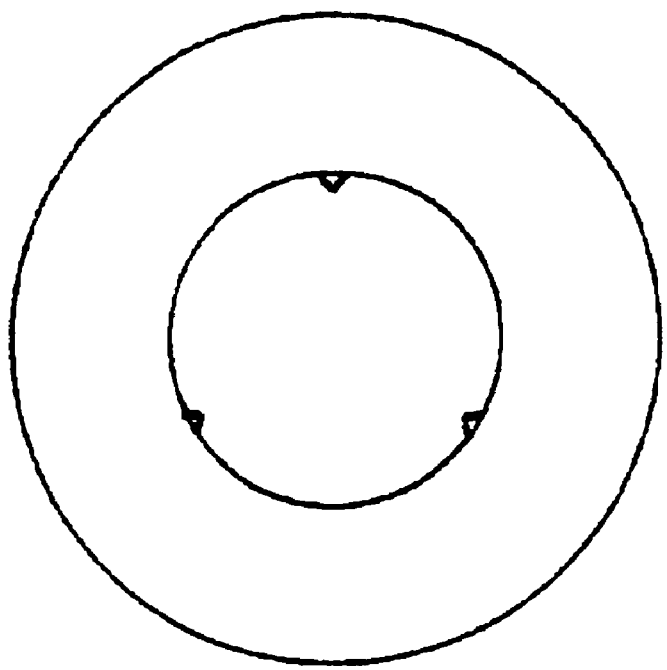
FIG. 5 top view of central passage.

5 is the central passage which secures the paper stick. The central passage has three vertical oriented separations (120°apart) created by extensions 15 for holding the lollipop stem and stick in place. See FIG. 5. This is designed so that the child cannot easily remove the lollipop from the device. The central passage extends throughout the entire device. this enables an adult to be able to insert an unused paper stick into the lower most portion of the central passageway in order to push the used paper stick out of the upper portion of the device for disposal.

The central passage should run down through the center of the handle and be of size and shape in order to hold the narrow paper stick of the lollipop. The central passage allows the paper stick handle to be pushed into the central passage and be securely held there. This passage should run the entire length of the device which would preferably be about 3 and ¾" but other lengths are possible without varying from the spirit of the invention.

6 is the base also referred to as the lower rim (or bottom piece). The upper portion 12 of the base snaps into the cylinder shaped handle. The upper portion of the base does not increase the length of the handle (4) it slides into the handle making the lower rim 14 of the base become flush with the lower end of the handle 4. Thus, the handle even without the base can be hand held. The lower portion 14 or rim of the base allows the device to be in an upright standing position when not in use.

The lower rim of the base measures about 21" in diameter; this size prevents a child from putting any portion of the handle in his or her mouth. Thus preventing throat and/or mought injuries. Also note that should the device tip over with a messy lollipp in it, the measurement and design of both the upper 3 and lower (base) 6 rims prevent the lollipop from coming into contact with furniture, carpet, etc.

The base or bottom 6 is removable from the bottom of the handle portion so that when the base is removed, the open bottom of passage 5 will be exposed and the used lollipop can be pushed upward for removal from the handle.

The rim 3 at the top should be of size sufficient to prevent the child from forcing this end with the lollipop 1 into his mouth thus preventing mouth and throat injuries.

The bottom rim 6 will also be of size to prevent the child from placing it into his mouth. The bottom rim will also provide a convenient stand upon which to rest the lollipop and handle when not in use. The bottom surface of the bottom should be flat so as to allow the handle and lollipop combination to be stood upright on a table or other surface should the youngster so desire.

The base has a central passage inside of the upper portion 12 that will be coextensive with the passage 5 when the base 6 is locked into the bottom of the handle. The diameter of the upper portion 12 may be chosen so that it will frictionally interlock with the open end of the channel 5. That channel within the extended portion is preferably closed at the bottom end.

Thus, one can push a used lollipop stick out by pushing, for example, a new lollipop through the open bottom of the handle in order to force the old lollipop out through the top. In this case, the interlocking base must first be removed from the handle. In addition, an old lollipop could be removed manually by covering the fingers with a napkin, for example and then removing it in that way.

The extension piece is shown as 2 in FIG. 1. Such piece may be about ½" in length. It should extend above the upper rim by a short distance. The extension piece will have the same central passage continuous with the central passage in the handle. The extension will maintain the candy part at a safe distance away from the handle. which will be attached to the center of the head. This will prevent the candy from coming in contact with the fingers of the child among other things.

It is preferred that handle and base be made as two pieces that are adapted to interlock with one another. Note the construction of the base shown in FIG. 7. It is thought that plastic would be a preferred materials for both handle and base. Other reusable materials may also find use in the invention. Such handle could be made through an injection molding process. Other methods for making the handle may be used without violating the sprit of this invention.

I claim:

1. A two part protective handle for handling and supporting a lollipop or other similar food that are attached to a long thin stick that are consumed by children, said protective handle comprising, a first part comprising a longitudinally extending upper handle portion and a second part comprising a lower base portion;

said longitudinally extending handle portion comprising a main body being of sufficient length to be held by a full hand and comprising toward its upper end, above the main body
to be held, an outwardly extending transverse upper rim and a longitudinally extending extension above said upper rim;

said base portion comprising a longitudinally extending upper portion and a lower outwardly extending transverse lower rim;

said handle portion extension, main body and said upper portion of said base portion all having central passageways there through;

said upper portion of said base portion is of a size and shape to removably frictionally fit within the lower end of said central passageway of said main body of said handle portion, said central passageway in said upper portion of said base portion having a closed lower end so that when said upper portion of said base portion is inserted into said main body, said base portion closes access to the central passageway in said main body from below;

said passageways being axially aligned and in communication with each other when said base portion is inserted in said lower end of said handle portion, to provide a continuous passageway from the top of said extension of said handle portion to the bottom of said upper portion of said base portion;

said passageways in said extension of said handle portion and said main body being of a size and shape to securely hold said stick in an upright position when said stick is inserted down into said passageway in said handle portion extension and into said passageway of said main body;

said handle portion extension being of a length sufficient to maintain the food attached to the stick a distance away from said transverse upper rim when the stick is enclosed in said handle portion and the food rests on the top surface of said handle portion extension sufficient to prevent the child from biting the stick off;

said upper rim being of a size and shape to conform to and go over a child's lips and mouth to prevent the lollipop or other food on a thin stick from forced or accidental entry into a child's throat;

said lower rim being of a size both to prevent a child from placing it into the mouth and to provide a stand upon which allows the lollipop or other food on a stick when not in use to stand upright on a support surface.

2. The apparatus of claim 1 wherein said handle portion extension is about ½" in height.

3. The apparatus of claim 5 wherein said transverse upper rim is about 2.25" in diameter.

* * * * *